(12) United States Patent
Crutcher et al.

(10) Patent No.: US 8,965,150 B2
(45) Date of Patent: Feb. 24, 2015

(54) OPTICAL SWITCH ASSEMBLY FOR DETECTING MOVEMENT

(71) Applicant: CommScope, Inc. of North Carolina, Hickory, NC (US)

(72) Inventors: W. Larkin Crutcher, Plano, TX (US); Anil K. Trehan, Plano, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 227 days.

(21) Appl. No.: 13/742,893

(22) Filed: Jan. 16, 2013

(65) Prior Publication Data

US 2013/0136394 A1    May 30, 2013

Related U.S. Application Data

(63) Continuation-in-part of application No. 12/474,384, filed on May 29, 2009, now Pat. No. 8,368,534.

(60) Provisional application No. 61/056,878, filed on May 29, 2008.

(51) Int. Cl.
| | | |
|---|---|---|
| *G02B 6/42* | (2006.01) | |
| *G02B 6/00* | (2006.01) | |
| *G02B 6/35* | (2006.01) | |
| *G08B 13/08* | (2006.01) | |

(52) U.S. Cl.
CPC . *G02B 6/35* (2013.01); *G08B 13/08* (2013.01)
USPC .................. 385/16; 385/39; 385/53; 385/100; 385/134

(58) Field of Classification Search
USPC ..................... 385/12–13, 16–21, 39, 53, 100, 385/134–135, 140; 250/227.14–227.16
See application file for complete search history.

(56) References Cited

U.S. PATENT DOCUMENTS

| | | | |
|---|---|---|---|
| 4,174,149 A | 11/1979 | Rupp | |
| 4,292,628 A | 9/1981 | Sadler | |
| 4,636,029 A | 1/1987 | Johansson et al. | |
| 5,684,671 A | 11/1997 | Hobbs et al. | |
| 6,002,501 A | 12/1999 | Smith et al. | |
| 6,262,415 B1 | 7/2001 | Goldner | |
| 6,411,215 B1 | 6/2002 | Shnier | |
| 6,415,150 B1 | 7/2002 | Owens et al. | |
| 6,507,278 B1 | 1/2003 | Brunetti et al. | |
| 6,900,726 B2 | 5/2005 | Graves | |
| 6,927,690 B2 | 8/2005 | Wilson | |
| 6,937,151 B1 | 8/2005 | Tapanes | |

(Continued)

*Primary Examiner* — Akm Enayet Ullah
*Assistant Examiner* — Michael Mooney
(74) *Attorney, Agent, or Firm* — Myers Bigel Sibley & Sajovec (57) ABSTRACT

An optical switch assembly includes a first member, a second member movably secured to the first member, and first and second optical cable connectors attached to the first member. The second member is movable between first and second positions relative to the first member. The optical switch assembly also includes an optical cable having opposite first and second ends. The optical cable first end is in optical communication with the first optical cable connector and the optical cable second end is attached to the second member. Movement of the second member to the second position causes the optical cable second end to be in optical communication with the second optical cable connector such that an optical path is established between the first and second optical cable connectors. The establishment of an optical path allows the optical cable to pass an optical signal back to a monitoring station.

20 Claims, 7 Drawing Sheets

(56) References Cited

U.S. PATENT DOCUMENTS

| | | |
|---|---|---|
| 6,975,220 B1 | 12/2005 | Foodman et al. |
| 7,469,102 B2 | 12/2008 | Lee et al. |
| 7,488,929 B2 | 2/2009 | Townley-Smith et al. |
| 7,514,670 B2 | 4/2009 | Anderson et al. |
| 7,782,196 B2 | 8/2010 | Piper et al. |
| 7,852,213 B2 | 12/2010 | Browning et al. |
| 7,956,316 B2 | 6/2011 | Browning et al. |
| 2006/0093359 A1 | 5/2006 | Lee et al. |

OPTICAL SWITCH ASSEMBLY FOR DETECTING MOVEMENT

RELATED APPLICATION

This application is a continuation-in-part of U.S. patent application Ser. No. 12/474,384, filed May 29, 2009, which claims the benefit of and priority to U.S. Provisional Patent Application No. 61/056,878, filed May 29, 2008, the disclosures of which are incorporated herein by reference as if set forth in their entireties.

FIELD OF THE INVENTION

The present invention relates generally to monitoring the opening and closing of a door and, more particularly, to monitoring and detecting the unauthorized opening and closing of a door.

BACKGROUND

Many businesses have dedicated telecommunication systems that enable computers, telephones, facsimile machines and the like to communicate with each other through a private network and with remote locations via a communications service provider. In most buildings, the dedicated communications system is hard wired using telecommunication cables that contain conductive wires. In such hard wired systems, dedicated wires are coupled to individual service ports throughout the building. Conventionally, the wires from the dedicated service ports extend through the walls of the building to a communications closet or closets. The communications lines from the interface hub of a main frame computer or network and the telecommunication lines from external telecommunication service providers may also terminate within a communications closet. The communications line may comprise, for example, a communications cable or patch cord that contains four twisted pairs of conductors.

A patching system is typically used to interconnect the various telecommunication lines within a communications closet. In a communications patching system, the telecommunication lines are terminated within a communications closet or room in an organized manner. The organized terminations of the various lines are provided via the structure of the communications closet. One or more mounting frames having one or more racks of patch panels and other equipment are typically located in a communications closet.

Mounting frames within communications closets may include doors for controlling access to the equipment therewithin. Monitoring the opening and closing of communications equipment doors is useful in determining whether the security of the communications equipment has been violated or compromised.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to some embodiments of the present invention, a remote door access monitoring system includes a central monitoring component and a remote monitoring component. The central monitoring component includes an optical source, an optical power level receiver, and a microcontroller. The optical power level receiver is in communication with the microcontroller. The remote monitoring component includes an optical switch that is operably associated with a door of a communications equipment cabinet. The communications equipment cabinet is located at a geographical location different from a geographical location of the central monitoring component. The optical source transmits an optical signal from the optical source to the optical switch and back to the optical power level receiver. The optical switch attenuates the optical signal in response to the movement of the door (i.e., opening and closing of the door). The optical power level receiver is configured to detect an attenuated optical signal and then notify the microcontroller of the existence of an attenuated optical signal.

In some embodiments, the microcontroller sends an alarm signal to an administration system in response to receiving notification of an attenuated optical signal from the optical power level receiver. The alarm signal may be sent via electronic mail (e-mail), for example over an ethernet or other type of interface.

In some embodiments, the microcontroller activates a door intrusion relay contact closure and/or an alarm indicator light in response to receiving notification of an attenuated optical signal from the optical power level receiver. The intrusion relay serves to alert an operator of an open door condition.

According to other embodiments of the present invention, a remote door access monitoring system includes a central monitoring component and a remote monitoring component. The central monitoring component includes an optical source, an optical power level receiver, and a microcontroller. The optical power level receiver is in communication with the microcontroller. The remote monitoring component includes an optical switch operably associated with a door that is located at a geographical location different from a geographical location of the central monitoring component. The optical source transmits an optical signal from the optical source to the optical switch and back to the optical power level receiver via a single optical fiber. In some embodiments, optical signals travel bidirectionally through the optical fiber via a pair of optical couplers. The optical switch attenuates the optical signal in response to opening or closing of the remote door, and the optical power level receiver is configured to detect an attenuated optical signal and notify the microcontroller of the existence of an attenuated optical signal.

According to other embodiments of the present invention, a remote door access monitoring system includes a central monitoring component and a remote monitoring component. The central monitoring component includes an optical source, an optical power level receiver, and a microcontroller. The optical power level receiver is in communication with the microcontroller. The remote monitoring component includes an optical switch operably associated with a door that is located at a geographical location different from a geographical location of the central monitoring component. The optical source transmits a continuous light signal from the optical source to the optical switch via a first optical fiber, and from the optical switch to the optical power level receiver via a second optical fiber. The optical switch attenuates the optical signal in response to opening or closing of the remote door, and the optical power level receiver is configured to detect an attenuated optical signal and notify the microcontroller of the existence of an attenuated optical signal.

According to other embodiments of the present invention, an optical switch assembly is provided that detects relative movement between two devices, between two parts of a device, between a door and frame/enclosure, etc. The optical switch assembly is a passive device and does not require electrical power for operation. The optical switch assembly includes a first member, a second member movably secured to the first member, and first and second optical cable connectors attached to the first member. The second member is movable between first and second positions relative to the first member. The optical switch assembly also includes an optical cable having opposite first and second ends. The optical cable first end is in optical communication with the first optical cable connector and the optical cable second end is attached to the second member. In some embodiments, the optical cable second end is directly attached to an optical coupler that is part of the second member. Movement of the second member to the second position causes the optical cable second end to be in optical communication with the second optical cable connector such that an optical path is established between the first and second optical cable connectors. The establishment of an optical path allows the optical cable to pass an optical signal back to a monitoring station.

In some embodiments, a biasing member may be provided to urge the second member to the first position. Alternatively, the biasing member could be configured to urge the second member to the second position.

According to some embodiments of the present invention, an optical switch assembly is provided in combination with a door (e.g., a door of an electronic equipment enclosure, a door of a communications equipment cabinet, etc.) that is movable between open and closed positions relative to a frame. The optical switch assembly includes a first member attached to one of a door or door frame and a second member movably secured to the first member. The second member is movable between first and second positions relative to the first member and moves to the second position responsive to movement of the door to an open position. The optical switch assembly also includes first and second optical cable connectors attached to the first member and an optical cable having opposite first and second ends. The optical cable first end is in optical communication with the first optical cable connector, and the optical cable second end is attached to the second member. Movement of the second member to the second position causes the optical cable second end to be in optical communication with the second optical cable connector such that an optical path is established between the first and second optical cable connectors.

According to some embodiments of the present invention, an optical switch assembly is provided in combination with a device (e.g., an electronic device, a component of an electronic device, etc.). The optical switch assembly includes a first member attached to the device and a second member movably secured to the first member. The second member is movable between first and second positions relative to the first member and moves to the second position responsive to movement of the device. The optical switch assembly also includes first and second optical cable connectors attached to the first member and an optical cable having opposite first and second ends. The optical cable first end is in optical communication with the first optical cable connector, and the optical cable second end is attached to the second member. Movement of the second member to the second position causes the optical cable second end to be in optical communication with the second optical cable connector such that an optical path is established between the first and second optical cable connectors.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

DETAILED DESCRIPTION

The present invention now is described more fully hereinafter with reference to the accompanying drawings, in which some embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present.

It will be understood that, although the terms "first", "second", etc. may be used herein to describe various elements, components, optical fibers, couplers, switches, receivers, etc., these elements, components, optical fibers, couplers, switches, receivers, etc. should not be limited by these terms. These terms are only used to distinguish one element, component, optical fiber, coupler, switch, receiver, etc. from another element, component, optical fiber, coupler, switch, receiver. Thus, a "first" element, component, optical fiber, coupler, switch, receiver discussed below could also be termed a "second" element, component, optical fiber, coupler, switch, receiver without departing from the teachings of the present invention. In addition, the sequence of operations (or steps) is not limited to the order presented in the claims or figures unless specifically indicated otherwise.

Figure 1:
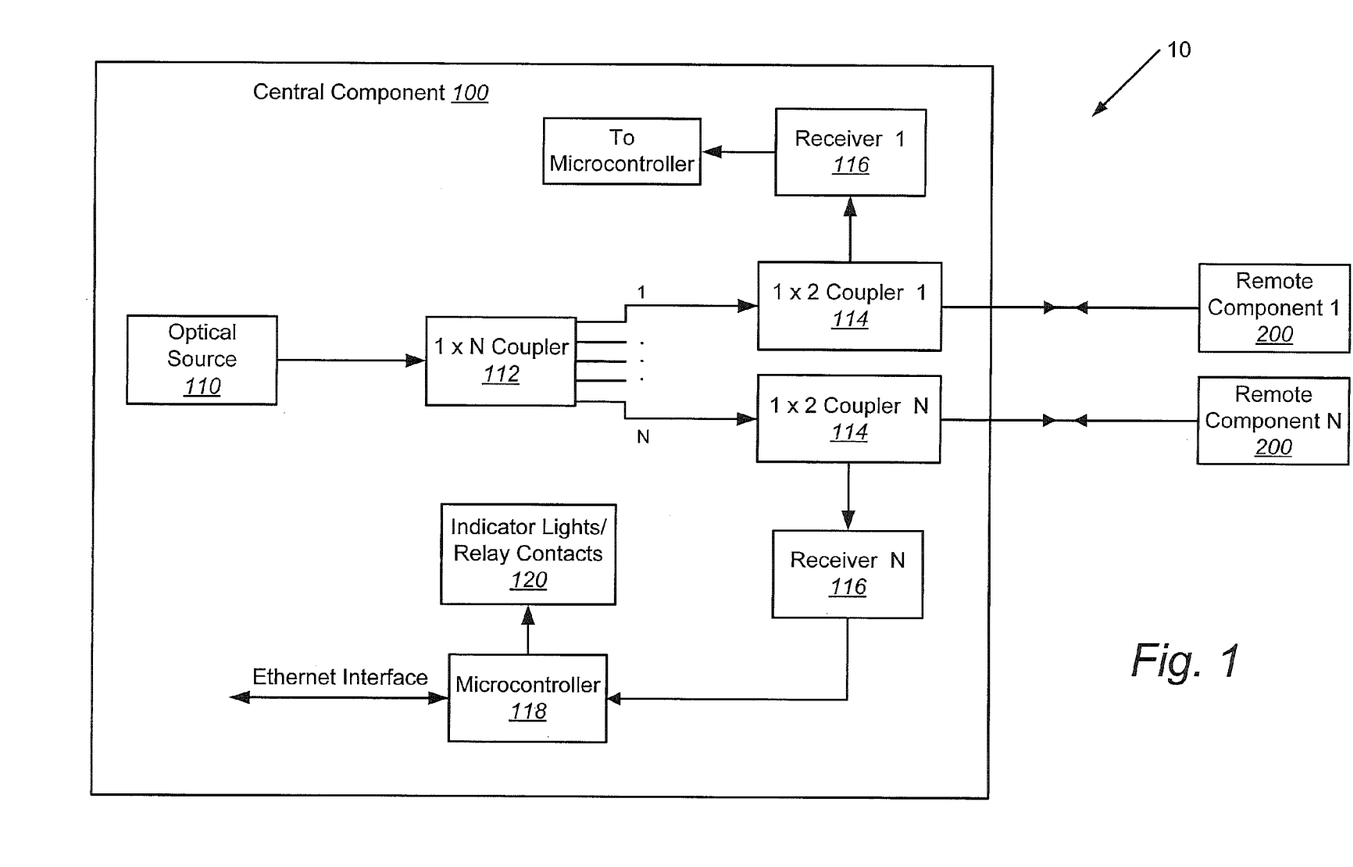
FIG. 1 is a block diagram illustrating a "one optical fiber" remote door access sensing system, according to some embodiments of the present invention.
Figure 3:
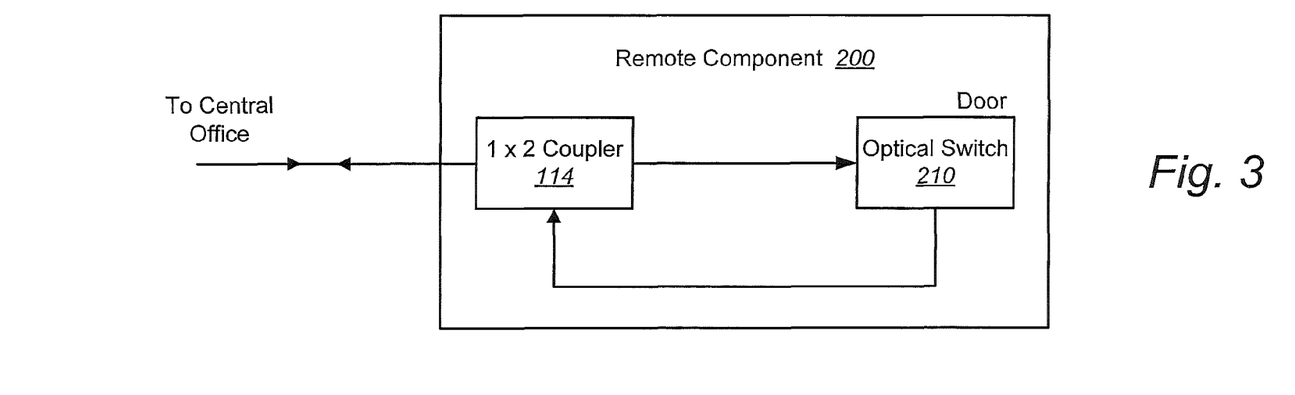
FIG. 3 is a block diagram illustrating a single door monitored via the "one optical fiber" remote door access sensing system of FIG. 1.
Figure 4:
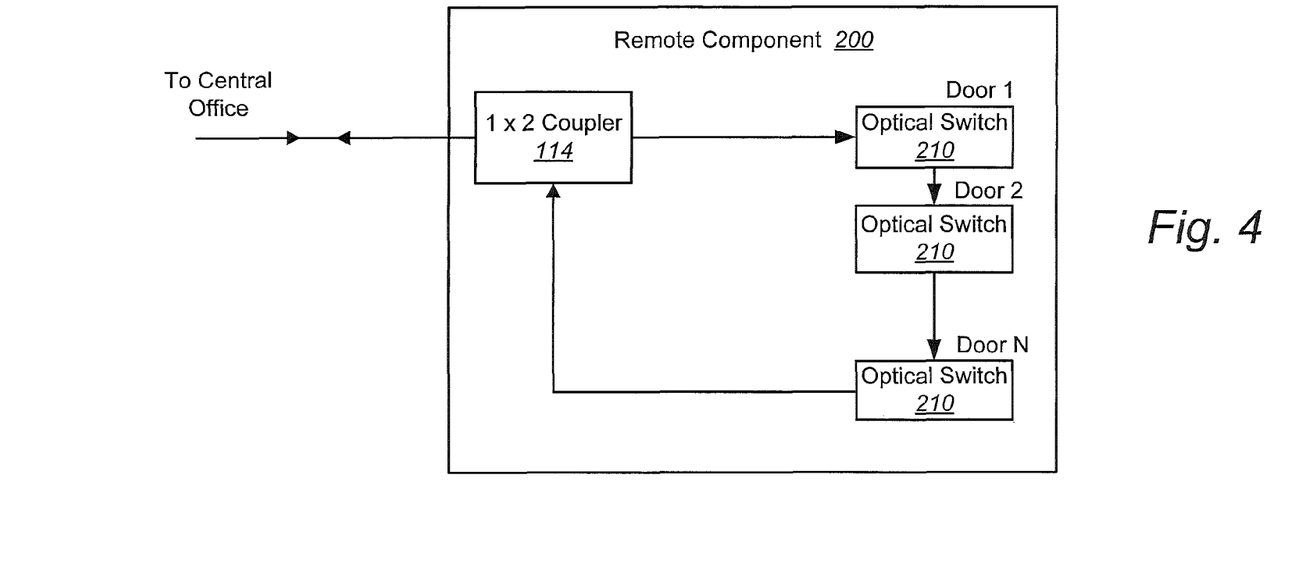
FIG. 4 is a block diagram illustrating multiple doors monitored via the "one optical fiber" remote door access sensing system of FIG. 1.

Referring initially to FIGS. 1, 3 and 4, a remote door access sensing system 10, according to some embodiments of the present invention, is illustrated. The system 10 is used to remotely monitor the status of doors in a remote cabinet/enclosure (e.g., whether a remote door has been opened or closed). The system 10 includes a central monitoring component 100 and at least one remote monitoring component 200. The central monitoring component 100 is typically located in a central office or data center location and includes an optical source 110, various optical couplers 112, 114, optical power level receivers 116, and a microcontroller 118. The remote monitoring component 200 includes an optical switch 210 associated with each monitored door of a remotely located cabinet/enclosure and an optical coupler 114. The central monitoring component 100 and remote monitoring component 200 are connected to one another by one fiber optic cable.

As known to those skilled in the art of the present invention, an optical switch is a switch that enables optical signals in an optical fiber to be selectively switched from one circuit to another. Each optical switch 210, according to embodiments of the present invention, is configured to alter or attenuate a light signal in an optical fiber as a result of the opening and closing of a remote door. Various types of optical switches may be utilized in accordance with embodiments of the present invention. For example, optical switch 210 may operate by mechanical means, such as physically bending an optical fiber or interrupting the beam of a free space collimated light path, etc.

Optical source 110 may be a laser, a light emitting diode (LED), or any other source capable of producing an optical signal (e.g., continuous, patterned, etc.).

As known to those skilled in the art of the present invention, an optical power level receiver is configured to extract information that has been placed on a light carrier. According to embodiments of the present invention, an optical power level receiver 116 extracts information placed on the light carrier by a respective remote switch 210.

Microcontroller 118 may include a clock for providing a time reference for each opening and closing of a remote door. Microcontroller 118 may include a memory (e.g., a non-volatile random access memory) that stores the occurrence and time of each opening and closing event.

FIG. 3 illustrates a remotely located cabinet/enclosure having only one monitored door. FIG. 4 illustrates a remotely located cabinet/enclosure having a plurality of monitored doors. Each remote optical switch 210 is operated by some physical motion such as the opening or closing of a door with which the optical switch 210 is associated. Each optical switch 210 is configured to either pass or attenuate an optical signal transmitted through a respective optical fiber from the optical source 110 in the central monitoring component 100.

The embodiment illustrated in FIGS. 1, 3 and 4 is referred to as a "one optical fiber" configuration. In the "one optical fiber" configuration, a 1×2 directional coupler 114 is located at or near each remote optical switch 210 (FIGS. 3, 4) and another 1×2 coupler 114 is located in the central monitoring component 100 (FIG. 1). These couplers 114 allow bidirectional operation on a single optical fiber. The optical signal from door 1 loops through each additional "downstream" remote door switch 210 prior to returning to the Central Office (Central Component 100). For example, as illustrated in FIG. 4, the optical signal from door 1 loops through each respective remote door switch 210 for door 2 through door N. Similarly, the optical signal from door 2 loops through each respective downstream remote door switch 210 through door N.

The optical source 110 can be connected to a single remote optical switch 210 via an optical fiber or can be split through a 1×N optical coupler 112 in order to send an optical signal to a number of remote optical switches 210, as illustrated in FIG. 1. In some embodiments, the value of N is 8; however, embodiments of the present invention are not limited to this value of N. N can have various values. In the embodiment illustrated in FIG. 1, the output of the 1×N optical coupler 112 is connected to a respective 2×1 optical coupler 114. The returning optical signal from a remote optical switch 210 is connected to an optical power level receiver 116 via coupler 114. The optical power level receiver 116 is configured to detect an attenuated signal from a remote optical switch caused by opening and/or closing of a remote door. The optical power level receiver 116 outputs an electrical signal which indicates whether or not a door opening or closing event has occurred. The optical power level receiver output voltage changes are proportional to the optical attenuation produced by the door optical switch. The analog to digital converter in the microcontroller analog inputs detects and processes these changes.

The electrical output of each optical power level receiver 116 is connected to an analog input of the microcontroller 118. There may be multiple optical power level receivers 116 connected to the same microcontroller 118. This configuration is advantageous because it can reduce system cost by using the same microcontroller function multiple times. The microcontroller 118 is configured to send the desired cabinet alarm signals to an administration system using a method such as an electronic mail (e-mail) message (e.g., via an ethernet or other interface associated with the microcontroller 118). Additionally the alarm information can be reported as door intrusion relay contact closure and/or alarm indicator lights 120 at the central office or data center.

Figure 2:
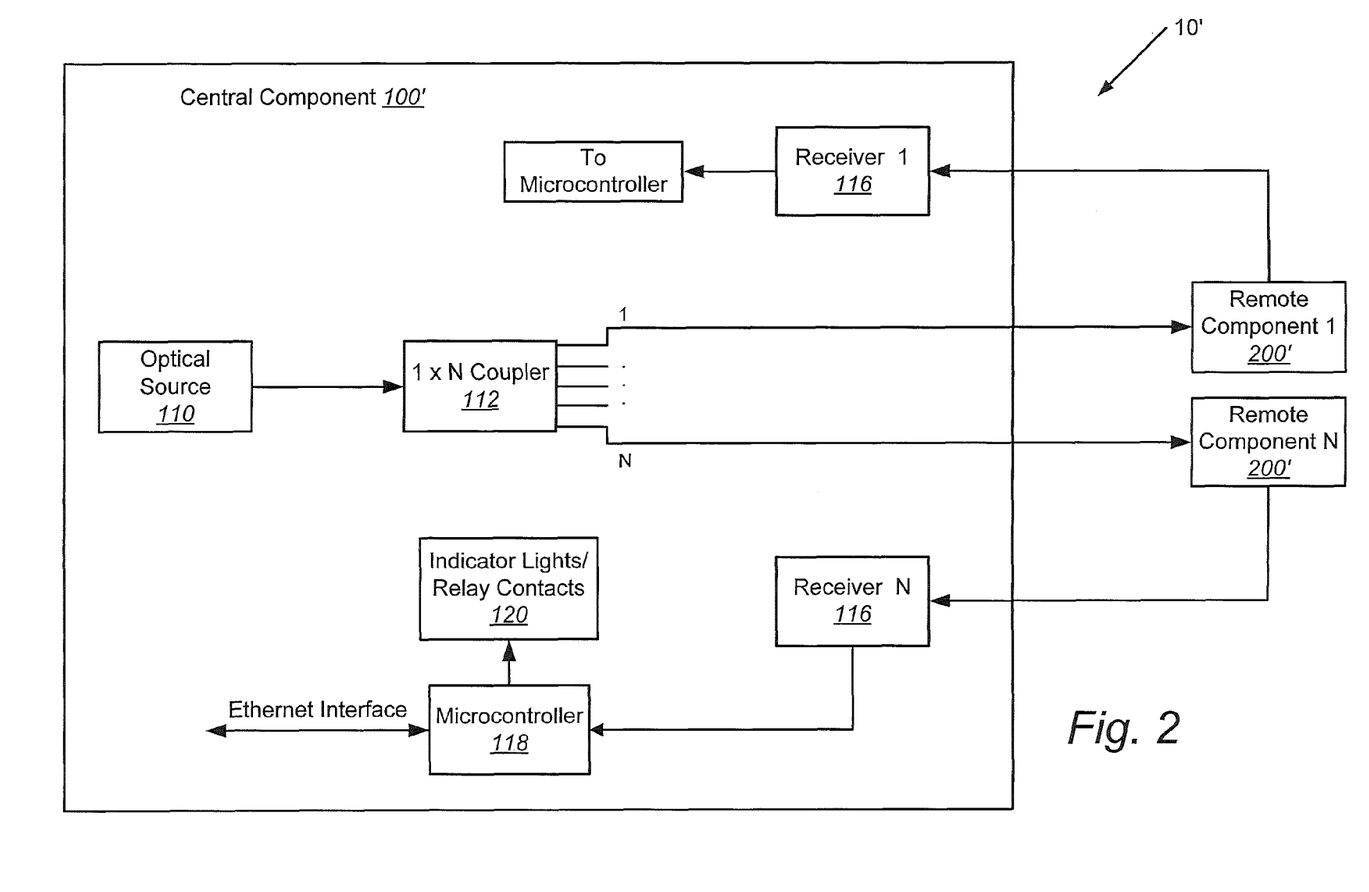
FIG. 2 is a block diagram illustrating a "two optical fiber" remote door access sensing system, according to other embodiments of the present invention.
Figure 5:
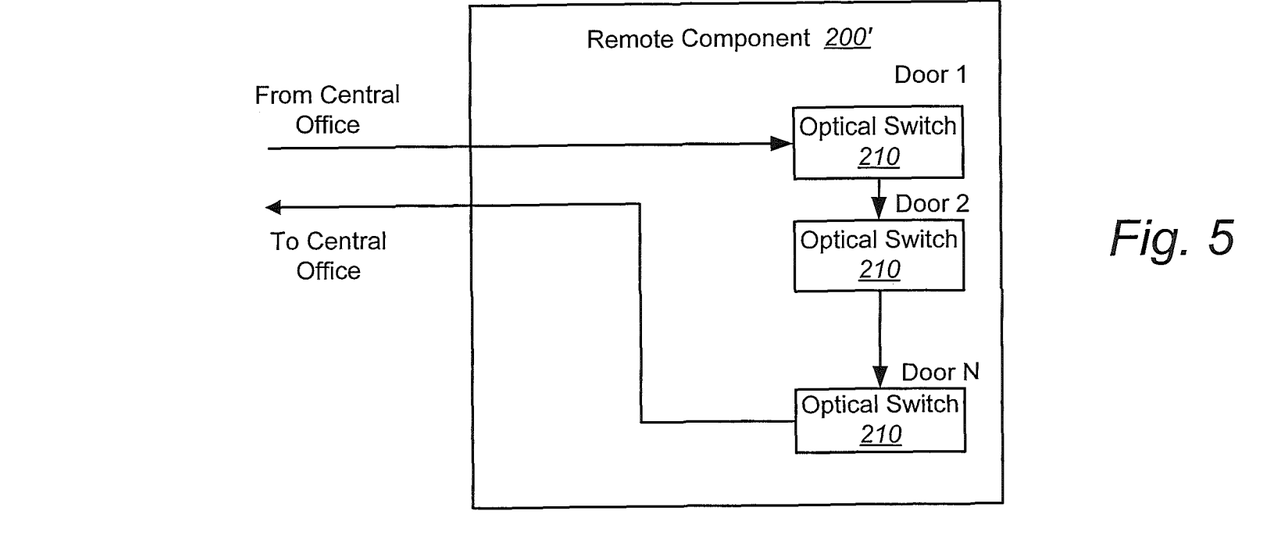
FIG. 5 is a block diagram illustrating multiple doors monitored via the "two optical fiber" remote door access sensing system of FIG. 2.

Referring to FIGS. 2 and 5, a remote door access sensing system 10', according to other embodiments of the present invention, is illustrated. The system 10' is used to remotely monitor the status of doors in a remote cabinet/enclosure (e.g., whether a remote door has been opened or closed). The system 10' includes a central monitoring component 100' and a remote monitoring component 200'. The central monitoring component 100' is typically located in a central office or data center location and includes an optical source 110, optical power level receivers 116 and a microcontroller 118. The central monitoring component 100' may include an optical coupler 112 in order to send an optical signal to a plurality of remote optical switches 210. The remote monitoring component 200' includes an optical switch 210 associated with each door of a remotely located cabinet/enclosure. The central monitoring component 100' and remote monitoring component 200' are connected to one another by two fiber optic cables. One optical fiber carries the optical signal to the remote switch 210 and the other optical fiber is the return signal path that communicates directly to an optical power level receiver 116 without requiring an optical coupler. The illustrated embodiment of FIGS. 2 and 5 is referred to as a "two optical fiber" configuration. The optical signal from door 1 loops through each additional "downstream" remote door switch 210 prior to returning to the Central Office (Central Component 100'). For example, as illustrated in FIG. 5, the optical signal from door 1 loops through each respective remote door switch 210 for door 2 through door N. Similarly, the optical signal from door 2 loops through each respective downstream remote door switch 210 through door N.

The returning optical signal from a remote optical switch 210 is connected to an optical power level receiver 116. The electrical output of each optical power level receiver 116 is connected to an analog input of the microcontroller 118. The microcontroller 118 is configured to send the desired cabinet alarm signals to an administration system using a method such as an electronic mail (e-mail) message (e.g., via an ethernet or other interface associated with the microcontroller 118). Additionally the alarm information can be reported as door intrusion relay contact closure and/or alarm indicator lights 120 at the central office or data center.

The term "remote", as used herein means that a cabinet/enclosure door being monitored is located at a different location than the location of the central monitoring component 100, 100'. For example, the door may be located at a geographical location that is different from the geographical location of the central monitoring component 100, 100'. This may include a door being located in a different room of a building, on a different floor of a building, in a different building, in a different city, etc.

Figure 6:
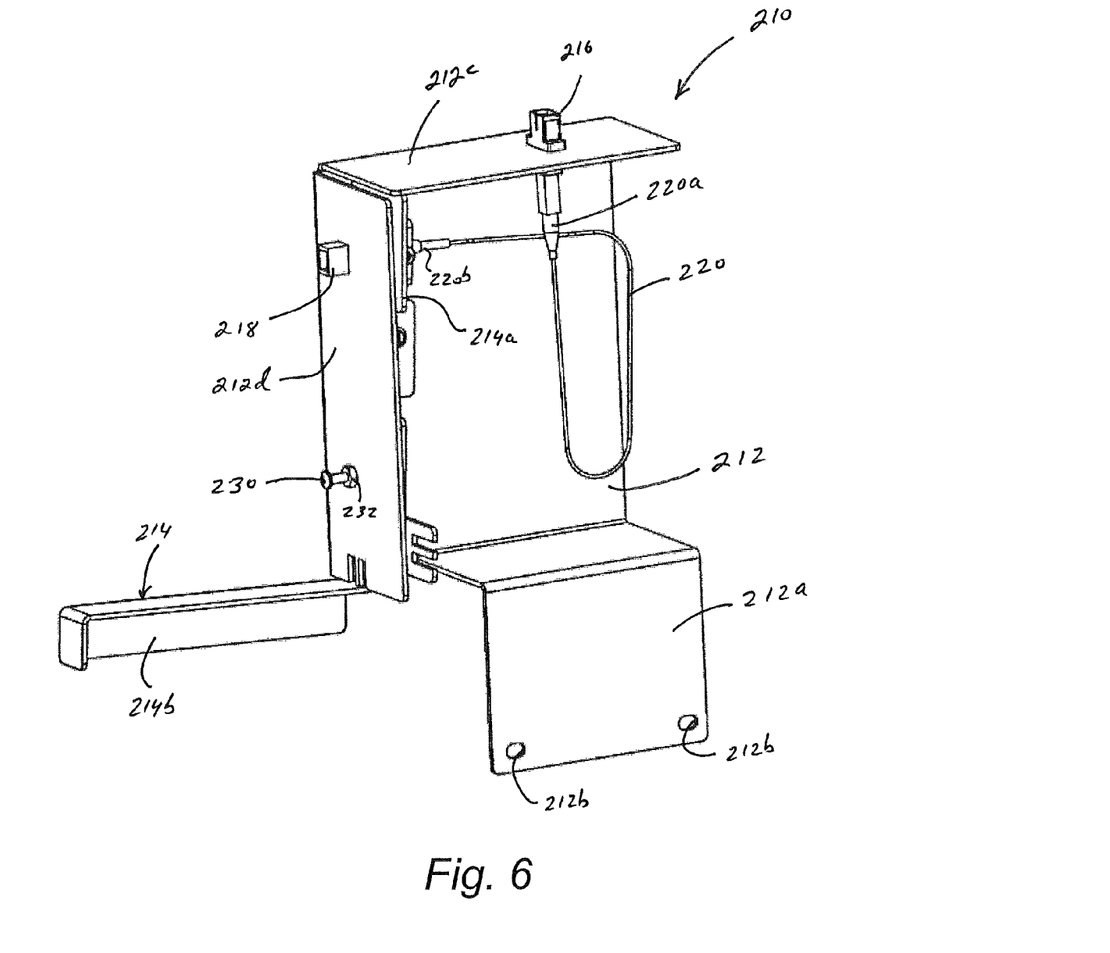
FIG. 6 is a perspective view of an optical switch assembly according to some embodiments of the present invention.
Figure 7:
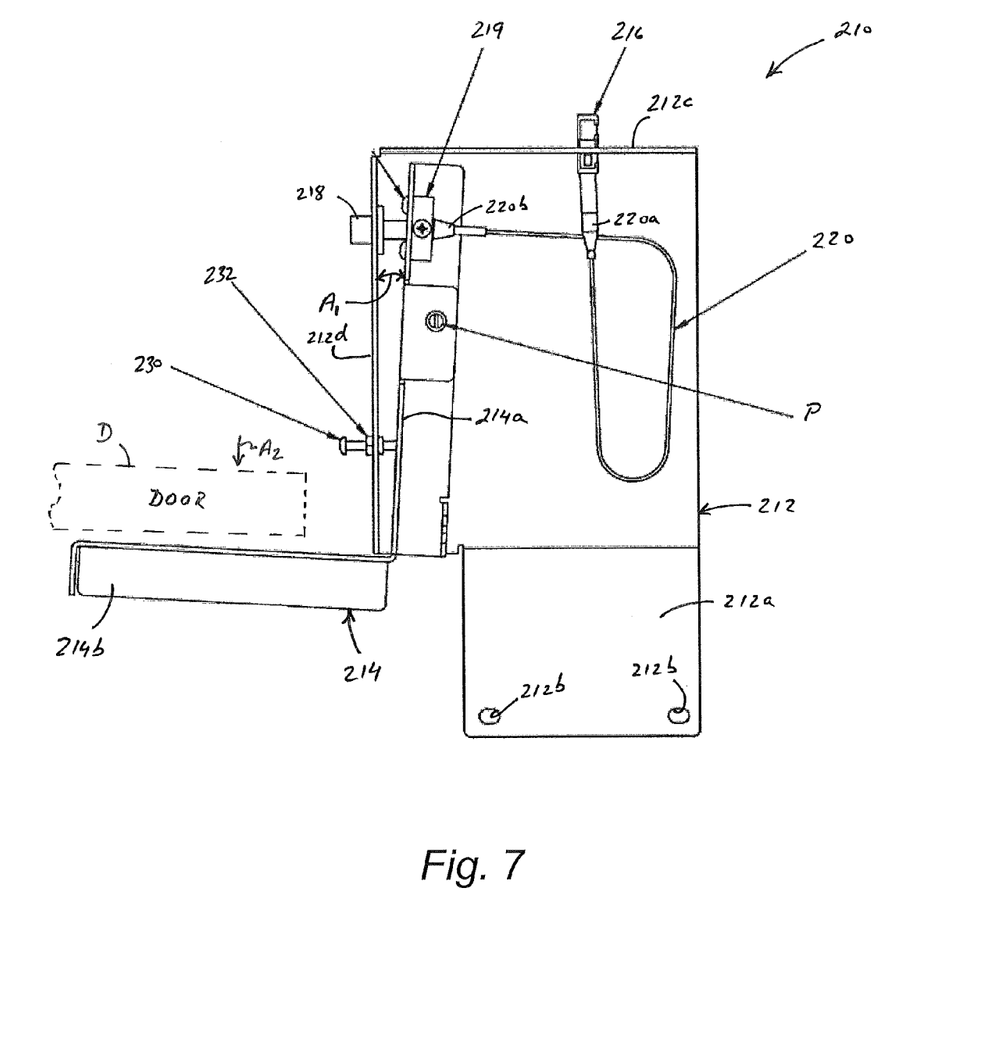
FIG. 7 is a front plan view of the optical switch assembly of FIG. 6.
Figure 8:
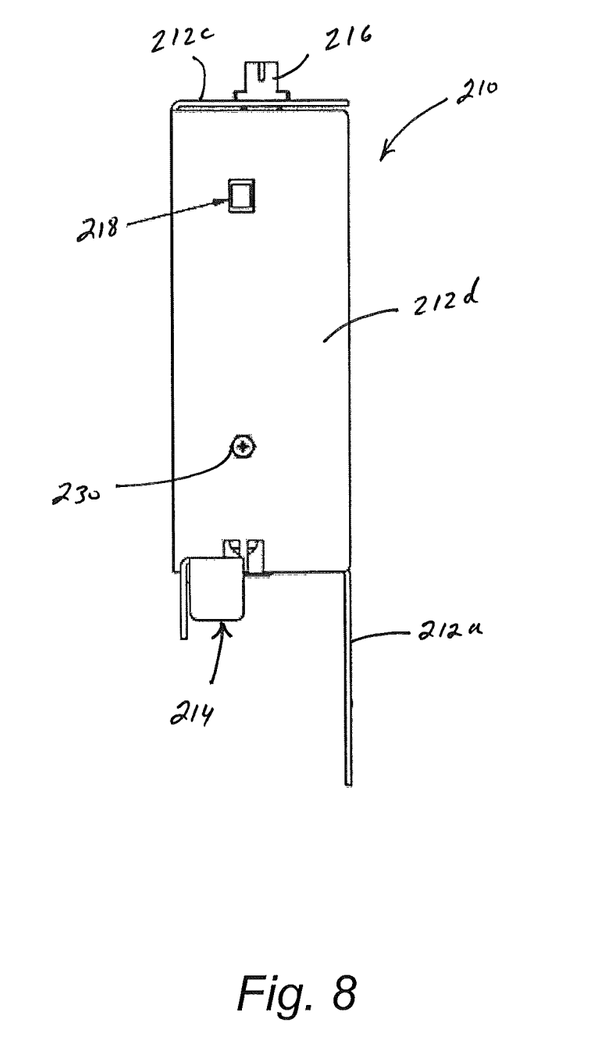
FIG. 8 is a side plan view of the optical switch assembly of FIG. 6.

Referring now to FIGS. 6-8, an optical switch assembly 210 for detecting relative movement between two parts and that may be utilized in each of the above-described embodiments of FIGS. 1-5, is illustrated. The optical switch assembly 210 includes a first member 212 and a second member 214 movably secured to each other such that the first and second members 212, 214 are movable relative to each other. In the illustrated embodiment, the first and second members 212, 214 are pivotably secured to each other at location P. However, various ways of movably connecting the first and second members 212, 214 may be utilized, as would understood by those skilled in the art. Embodiments of the present invention are not limited to any particular way of movably connecting the first and second members 212, 214.

In the illustrated embodiment, the first member 212 includes a portion 212a that is shaped and configured to attach the optical switch assembly 210 to an object, such as a door frame/enclosure, a piece of equipment, a device, etc. The first member attachment portion 212a includes apertures 212b through which fasteners can be used to secure the first member to another object. The illustrated second member 214 has an "L-shaped" configuration with first and second leg portions 214a, 214b. However, the first and second members 212, 214 may have various shapes and configurations, without limitation. Moreover, the first and second members 212, 214 may have various sizes such that the optical switch assembly 210 can be utilized with any type of door, equipment, or device where relative motion between two parts is to be detected.

The illustrated first and second members 212, 214 may be formed from various types of materials or combinations thereof, without limitation. For example, the first and second members 212, 214 may be formed of: metals, such as zinc, magnesium, titanium, copper, iron, steel, carbon steel, alloy steel, tool steel, stainless steel, spring steel, aluminum, any combination thereof, and/or other like materials; alloys, such as aluminum alloy, titanium alloy, magnesium alloy, copper alloy, any combination thereof, and/or other like materials; glasses (such as fiberglass), carbonfiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; and any other suitable material; and/or any combination thereof.

In the illustrated embodiment, the second member 214 is movable (represented by arrow $A_1$ in FIG. 7) between a first or open position (FIG. 7) and a second or closed position where the second member leg portion 214a is in contacting face-to-face relationship or substantially close face-to-face relationship with the first member side portion 212d.

The first member 212 includes a first optical cable connector 216 attached to an end portion 212c and a second optical cable connector 218 attached to a side portion 212d, as illustrated. Each optical cable connector 216, 218 is configured to receive a respective optical cable. For example, the first optical cable connector 216 is configured to receive an optical cable (not shown) that is connected to a light source and the second optical cable connector 218 is configured to receive an optical cable (not shown) that is connected to a remote monitoring device (e.g., central component 100, 100', FIGS. 1 and 2). Alternatively, the second optical cable connector 218 may be configured to receive an optical cable connected to a light source and the first optical cable connector 216 may be configured to receive an optical cable connected to a remote monitoring device (e.g., central component 100, 100', FIGS. 1 and 2). The first and second optical cable connectors 216, 218 may be any type of optical connector, without limitation. Moreover, the first and second optical cable connectors 216, 218 may be positioned at any location on the first member 212, without limitation.

The second optical connector 218 is configured to matingly engage an optical coupler device 219, such as part number C6070A-4, available from CommScope, Inc., Hickory, N.C. The optical switch assembly 210 includes an optical cable 220, such as a patch cable, having opposite first and second ends 220a, 220b. The optical cable first end 220a is in optical communication with the first optical cable connector 216 and the optical cable second end 220b is attached to the optical coupler device 219 on the second member 214. Movement of the second member 214 to the second position, such as via movement of a door D in the direction of $A_2$ (FIG. 7), causes the optical coupler device 219 to matingly engage with the optical connector 218 such that the optical cable 220 is in optical communication with the second optical cable connector 218 and such that an optical path is established between the first and second optical cable connectors 216, 218. The establishment of an optical path allows the optical cable 220 to pass an optical signal from a light source back to a monitoring station. Movement of the second member 214 to the first position causes the optical cable second end 220b to lose optical communication with the second optical cable connector 218 such that an optical path is broken between the first and second optical cable connectors 216, 218. The broken optical path is detectable by a remote monitoring station.

In some embodiments, the first member 212 may be secured to a door enclosure (e.g., an electronic equipment enclosure, communications equipment cabinet, etc.) such that movement (e.g., opening or closing) of a door causes the second member 214 to move from the first position to the second position. As such, the door movement causes the optical cable second end 220b to be in optical communication with the second optical cable connector 218 such that an optical path is established between the first and second optical cable connectors 216, 218. This allows an optical signal to pass to a remote monitoring station. Alternatively, the first member 212 is configured to be secured to a door enclosure (e.g., an electronic equipment enclosure, communications equipment cabinet, etc.) such that movement (e.g., opening or closing) of a door causes the second member 214 to move from the second position to the first position. As such, the door movement causes the optical cable second end 220b to lose optical communication with the second optical cable connector 218 such that an optical path is broken between the first and second optical cable connectors 216, 218. The broken optical path is detectable by a remote monitoring station.

In some embodiments, the first member 212 is configured to be secured to a device (e.g., an electronic device, a component of an electronic device, a device rack, etc.) such that movement of the device or a component of the device causes the second member 214 to move from the first position to the second position. As such, the movement causes the optical cable second end 220b to be in optical communication with the second optical cable connector 218 such that an optical path is established between the first and second optical cable connectors 216, 218. This allows an optical signal to pass to a remote monitoring station. Alternatively, the first member 212 is configured to be secured to a device such that movement of the device causes the second member 214 to move from the second position to the first position. As such, the movement causes the optical cable second end 220b to lose optical communication with the second optical cable connector 218 such that an optical path is broken between the first and second optical cable connectors 216, 218. The broken optical path is detectable by a remote monitoring station.

In the illustrated embodiment, an adjustment member 230 is secured to the first member wall 212d. The adjustment member 230 may be a threaded member, such as a bolt or screw, that is threadingly engaged with a nut mounted on the first member wall 212d. The adjustment member 230 is provided to allow adjustment of an amount of relative motion of the first and second members 212, 214 between the first and second positions, as would be understood by those skilled in the art.

In some embodiments of the present invention, the optical switch assembly 210 may include a biasing member, such as a spring. The biasing member may be provided to urge the second member 214 to the first position. Thus, movement of the second member 214, for example as a result of the opening of a door or movement of a device, overcomes the force of the biasing member. When the force of movement of the second member 214 is removed, the biasing member causes the second member 214 to move back to the first position. Alternatively, a biasing member could be configured to urge the second member 214 to the second position. Thus, movement of the second member 214, for example as a result of the opening of a door or movement of a device, allows the biasing member to urge the second member 214 to the second position.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An optical switch assembly, comprising:
   a first member;
   a second member movably secured to the first member and movable between first and second positions relative to the first member;
   first and second optical cable connectors attached to the first member; and
   an optical cable having opposite first and second ends, wherein the optical cable first end is in optical communication with the first optical cable connector, wherein the optical cable second end is attached to the second member, and wherein movement of the second member to the second position causes the optical cable second end to be in optical communication with the second optical cable connector such that an optical path is established between the first and second optical cable connectors.

2. The optical switch assembly of claim 1, further comprising a biasing member that is configured to urge the second member to one of the first or second positions.

3. The optical switch assembly of claim 1, wherein the first member is pivotably secured to the second member.

4. The optical switch assembly of claim 1, wherein the first member is configured to be secured to a door, and wherein movement of the door causes the second member to move from the first position to the second position.

5. The optical switch assembly of claim 4, wherein the door is a door of an electronic equipment enclosure.

6. The optical switch assembly of claim 1, wherein the first member is configured to be secured to a device, and wherein movement of the device causes the second member to move from the first position to the second position.

7. The optical switch assembly of claim 6, wherein the device is an electronic device.

8. The optical switch assembly of claim 6, wherein the device is a component of an electronic device.

9. The optical switch assembly of claim 1, wherein the first member is configured to be secured to an electronic equipment rack.

10. The optical switch assembly of claim 1, wherein the optical cable second end is directly attached to an optical coupler that is part of the second member.

11. The optical switch assembly of claim 10, wherein the optical coupler is configured to selectively mate with the second optical cable connector based on a position of a door of an enclosure.

12. An optical switch assembly in combination with a door, the combination comprising:
    a door movable between open and closed positions relative to a door frame;
    a first member attached to one of the door or door frame;

a second member movably secured to the first member and movable between first and second positions relative to the first member, wherein the second member moves to the second position responsive to movement of the door to an open position;

first and second optical cable connectors attached to the first member; and an optical cable having opposite first and second ends, wherein the optical cable first end is in optical communication with the first optical cable connector, wherein the optical cable second end is attached to the second member, and wherein movement of the second member to the second position causes the optical cable second end to be in optical communication with the second optical cable connector such that an optical path is established between the first and second optical cable connectors.

13. The combination of claim 12, further comprising a biasing member that is configured to urge the second member to one of the first or second positions.

14. The combination of claim 12, wherein the first member is pivotably secured to the second member.

15. The combination of claim 12, wherein the door is a door of an electronic equipment enclosure.

16. An optical switch assembly in combination with a device, the combination comprising:

a device;

a first member attached to the device;

a second member movably secured to the first member and movable between first and second positions relative to the first member, wherein the second member moves to the second position responsive to movement of the device;

first and second optical cable connectors attached to the first member; and an optical cable having opposite first and second ends, wherein the optical cable first end is in optical communication with the first optical cable connector, wherein the optical cable second end is attached to the second member, and wherein movement of the second member to the second position causes the optical cable second end to be in optical communication with the second optical cable connector such that an optical path is established between the first and second optical cable connectors.

17. The combination of claim 16, further comprising a biasing member that is configured to urge the second member to one of the first or second positions.

18. The combination of claim 16, wherein the first member is pivotably secured to the second member.

19. The combination of claim 16, wherein the device is an electronic device.

20. The combination of claim 16, wherein the device is a component of an electronic device.

* * * * *